US008047768B2

(12) United States Patent
Deodhar et al.

(10) Patent No.: US 8,047,768 B2
(45) Date of Patent: Nov. 1, 2011

(54) SPLIT IMPELLER CONFIGURATION FOR SYNCHRONIZING THERMAL RESPONSE BETWEEN TURBINE WHEELS

(75) Inventors: Subodh Diwakar Deodhar, Bangalore (IN); Nagesh Padmanabha Rao, Bangalore (IN)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 12/351,890

(22) Filed: Jan. 12, 2009

(65) Prior Publication Data
US 2010/0178162 A1    Jul. 15, 2010

(51) Int. Cl.
*F01D 5/08* (2006.01)
(52) U.S. Cl. .................... 415/115; 416/244 A
(58) Field of Classification Search ............. 415/115; 416/244 A
See application file for complete search history.

(56) References Cited

U.S. PATENT DOCUMENTS

| 3,874,824 | A | * | 4/1975 | Cronstedt et al. | 417/406 |
|---|---|---|---|---|---|
| 4,349,291 | A | * | 9/1982 | Geary, Jr. | 403/15 |
| 4,882,902 | A | | 11/1989 | Reigel et al. | |
| 5,143,512 | A | | 9/1992 | Corsmeier et al. | |
| 5,226,785 | A | | 7/1993 | Narayana et al. | |
| 5,537,814 | A | * | 7/1996 | Nastuk et al. | 60/796 |
| 6,234,746 | B1 | | 5/2001 | Schroder et al. | |

\* cited by examiner

*Primary Examiner* — Michael Lebentritt
(74) *Attorney, Agent, or Firm* — Cantor Colburn LLP

(57) ABSTRACT

An impeller system with split impeller configuration between adjacent turbine wheels for synchronizing their thermal response is provided. Exemplary embodiments include a turbomachine having a turbine, a compressor and a rotor disposed between the turbine and the compressor, and an impeller system. An impeller system includes a turbomachine wheel, and another turbomachine wheel disposed adjacent to the first turbomachine wheel, a rabbet joint defined between the first and second turbomachine wheels and a split impeller disposed on the first and second turbomachine wheels.

20 Claims, 3 Drawing Sheets

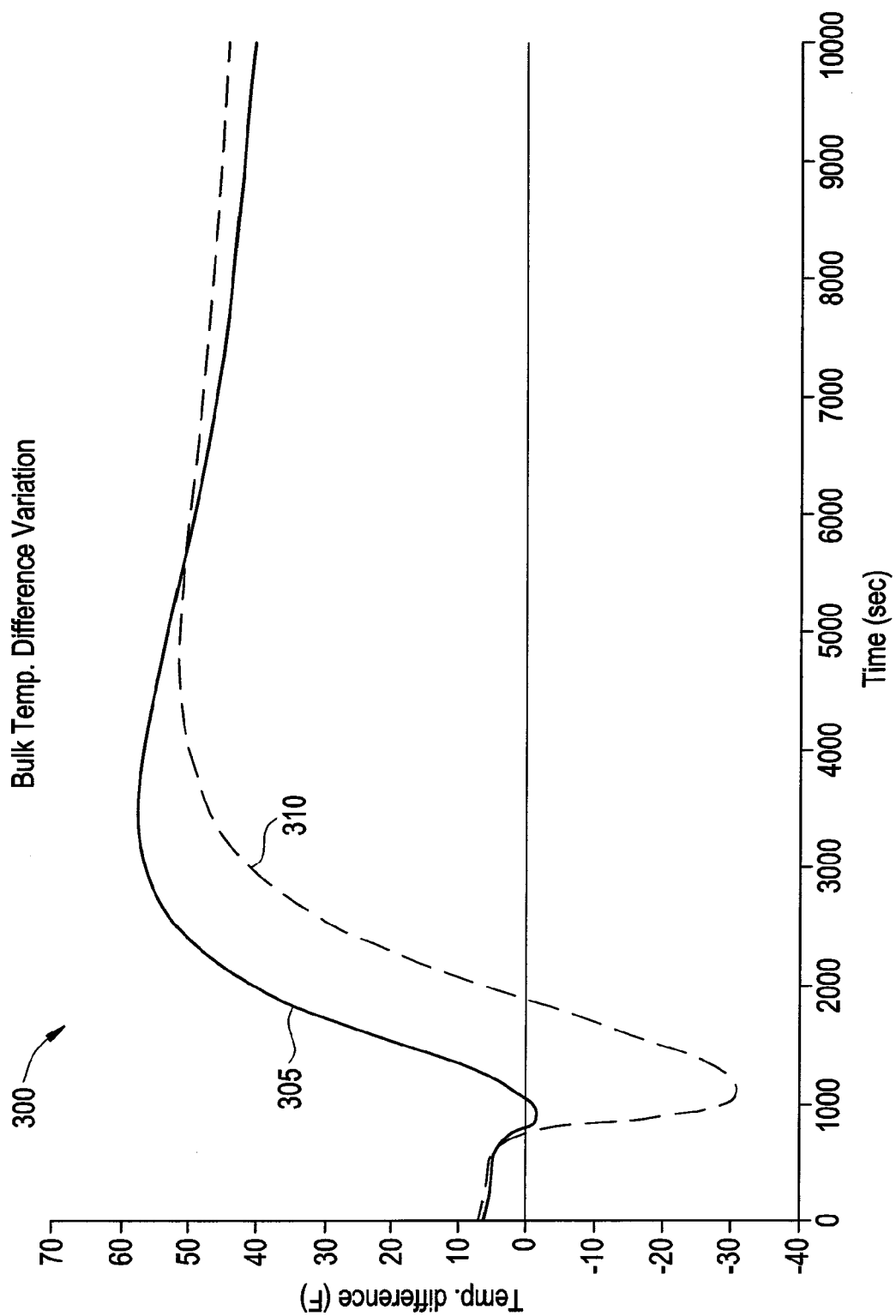

SPLIT IMPELLER CONFIGURATION FOR SYNCHRONIZING THERMAL RESPONSE BETWEEN TURBINE WHEELS

BACKGROUND OF THE INVENTION

The subject matter disclosed herein relates to thermal response of turbine wheels, and more particularly to a split impeller configuration on adjacent turbine wheels for synchronizing thermal response of the adjacent wheels.

FIG. 1 illustrates a prior art turbomachine 1. In the turbomachine 1, adjacent wheels 2, 3 on a compressor rotor 8 include a rabbet joint 4 between the wheels 2, 3. The rabbet joint 4 can crack due to high crushing stresses experienced during start up of the turbomachine 1. Studies of the cracking problem indicate that difference in thermal response of the two wheels 2, 3 is a significant contributor to high crushing stress. Thermal response of a given wheel is indicated by its bulk temperature variation during a transient. The difference in thermal response is represented by difference in bulk temperature of the two wheels 2, 3. A current impeller 5 is machined entirely on the wheel 2 and thereby wheel 2 heats up quicker than wheel 3. As a consequence, male portion 6 of the rabbet joint 4 heats up quicker than the female portion 7 of the rabbet joint 4. The difference in rates of heating causes high rabbet loads and thereby high crushing stress on the rabbet joint 4, which can lead to cracking. It is appreciated that the heat transfer area for the wheel 2 is greater than the heat transfer area for the wheel 3.

BRIEF DESCRIPTION OF THE INVENTION

According to one aspect of the invention, a turbomachine having a turbine, a compressor and a rotor disposed between the turbine and the compressor, and an impeller system is provided. The impeller system includes a first turbomachine wheel, a second turbomachine wheel disposed adjacent the first turbomachine wheel, a rabbet joint defined between the first and second turbomachine wheels and a split impeller disposed on the first and second turbomachine wheels.

According to another aspect of the invention, a gas turbine engine having a first stage wheel and a second stage wheel, and an impeller system is provided. The impeller system includes an upper impeller portion disposed on the first stage wheel, a lower impeller portion disposed on the second stage wheel and a rabbet joint disposed between the upper impeller portion and the lower impeller portion.

According to yet another aspect of the invention, a rotor assembly for a gas turbine engine having a first turbomachine wheel and a second turbomachine wheel, and an impeller system is provided. The impeller system includes a first stage wheel having an upper impeller portion, a second stage wheel having a lower impeller portion, a rabbet joint disposed between the upper impeller portion and the lower impeller portion, wherein the split impeller distributes transient heat flux on the first stage wheel and the second stage wheel evenly.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates an example a plot of bulk temperature difference versus time.

The detailed description explains embodiments of the invention, together with advantages and features, by way of example with reference to the drawings.

DETAILED DESCRIPTION OF THE INVENTION

Figure 2:
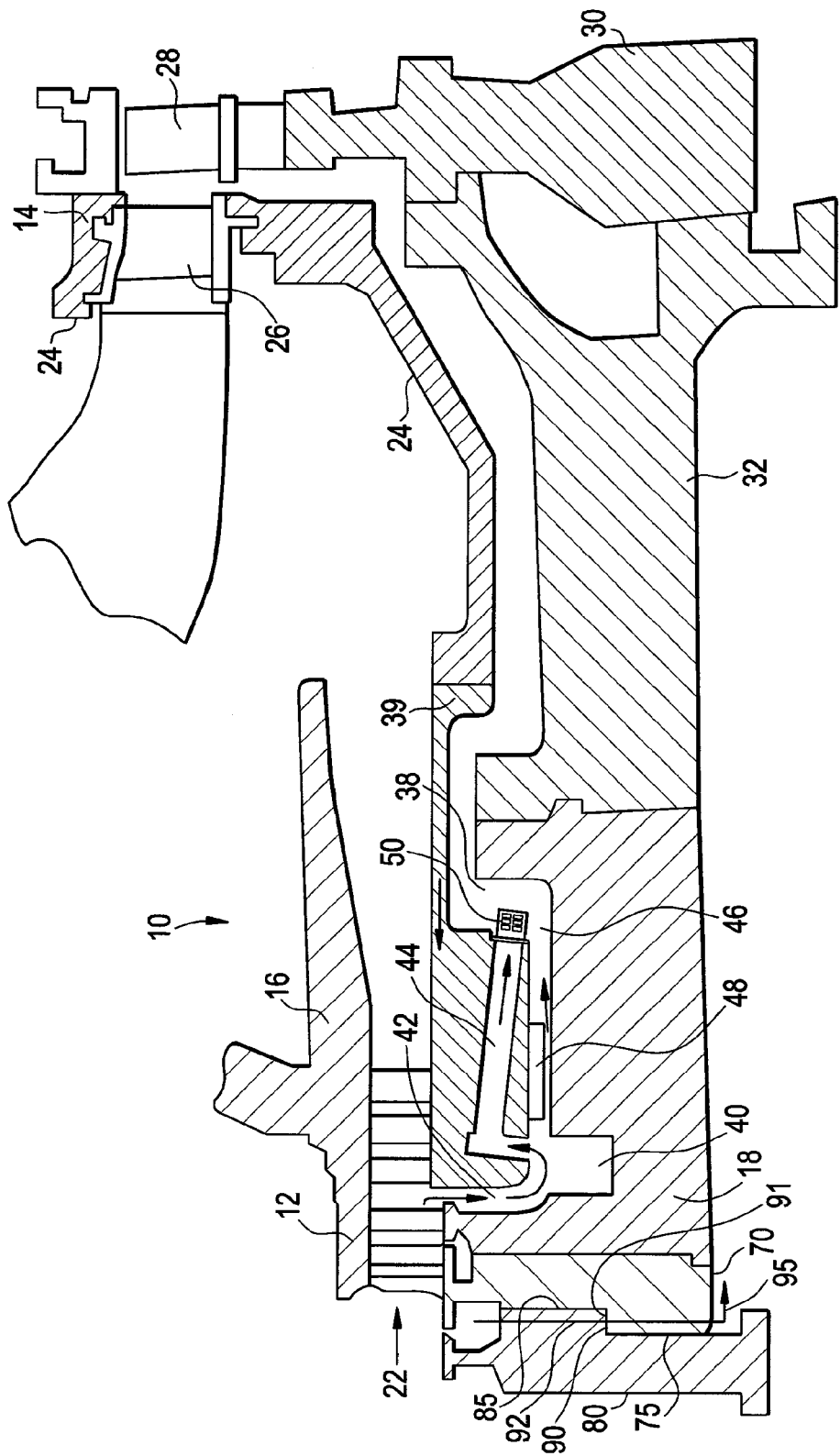
FIG. 2 illustrates a turbomachine incorporating a split impeller configuration according to a preferred embodiment of the present invention.

Referring now to the drawing figures, particularly to FIG. 2 there is illustrated a turbomachine, generally designated 10, and incorporating a split impeller configuration according to a preferred embodiment of the present invention. The turbomachine 10 includes a compressor section 12 and a turbine section 14. The compressor section 12 includes an outer fixed or stationary component 16 and a rotor 18 joined to a first turbomachine wheel 70 (wheel 70) that is coupled to a second turbomachine wheel 80 (wheel 80), the wheels 70, 80 mounting compressor blades (not shown). The wheels 70, 80 can be compressor wheels. Air is compressed along an annular flow path, designated by the arrow 22, and flows into the turbine section 14.

The turbine section 14 includes a fixed or stationary component 24 and a plurality of turbine stages, each including a stator blade 26 and a turbine blade 28 rotatable on a turbine wheel 30 forming part of the turbine rotor 32. The adjoining ends of the compressor rotor 18 and turbine rotor 32 carry flanges (not shown), which are rabbeted and bolted to one another by bolts (not shown) and form a rotary component within a cavity 38 surrounded by a fixed component, e.g., an inner barrel 39.

It is appreciated that the turbomachine 10 includes various cooling and sealing configurations about the compressor rotor 18 in the vicinity generally designated 40. For example, bleed air is taken from the compressor discharge air flowing in annular passage shown by arrow 22 for flow into the vicinity 40 in the compressor rotor 18. One or more of the bleed air passageways 42 may be provided for supplying the vicinity 40 with bleed air. Additional passages 44 can be provided at about the compressor rotor 18 for flowing compressor bleed air from the vicinity 40 into a cavity 38. An annular leakage flow path 46 between the stationary component 16 and the compressor rotor 18 is provided with a leakage seal 48. For example, the leakage seal may include labyrinth seals or brush seals or a combination of labyrinth/brush seals or other types of seals. Each of the exit ends of the passages 44 can include one or more vanes including a swirl device 50. It is appreciated that there are various cooling and sealing configurations contemplated in exemplary embodiments.

In exemplary embodiments, the wheels 70, 80 include a rabbet joint 90 disposed between the wheels 70, 80 and a split impeller including a lower impeller portion 75 and an upper impeller portion 85. In exemplary embodiments, the lower impeller portion 75 is machined on the wheel 70 and the upper impeller portion 85 is machined on the compressor wheel 80. It is therefore appreciated that the impeller is split and disposed on each of the wheels 70, 80. In exemplary embodiments, the rabbet joint 90 can include a male portion 92 and a female portion 91, which are disposed on the wheel 70 and wheel 80 respectively. It is appreciated that the male portion 92 can be disposed on the wheel 80 and the female portion 91 can be disposed on the wheel 70 in other exemplary embodiments. It is appreciated that in the split impeller, including the upper portion 85 and the lower portion 75, as described herein, transient heating is disposed substantially equally between the two wheels 70, 80. Referring again to FIG. 1, in current configurations, the impeller 5 is machined on the single wheel 2, which results in reduced rabbet contact between the wheels 2, 3 at the rabbet joint 4. Machining of the impeller on a single wheel causes unequal exposure of the wheels to extracted air and thereby unequal thermal response of the wheels 2, 3. In addition, it produces sudden expansion of the extracted air in an air path as shown by arrow 9 as the air travels along the path. Air can be extracted by the turbomachine 1 at the stage of that includes the wheel 2 for cooling buckets. The extraction travels through the impeller 5 machined on the wheel 2 as shown by the arrow 9.

Referring again to FIG. 2, in exemplary embodiments, by splitting the impeller into the upper portion 85 and the lower portion 75, air can be extracted at the stage of the turbomachine 10 that includes the wheel 70 and the wheel 80 for cooling buckets coupled to the wheels 70, 80. This extraction travels through the upper portion 85 on wheel 80 and the lower portion 75 on the wheel 70 as shown by the arrow 95.

Figure 1:
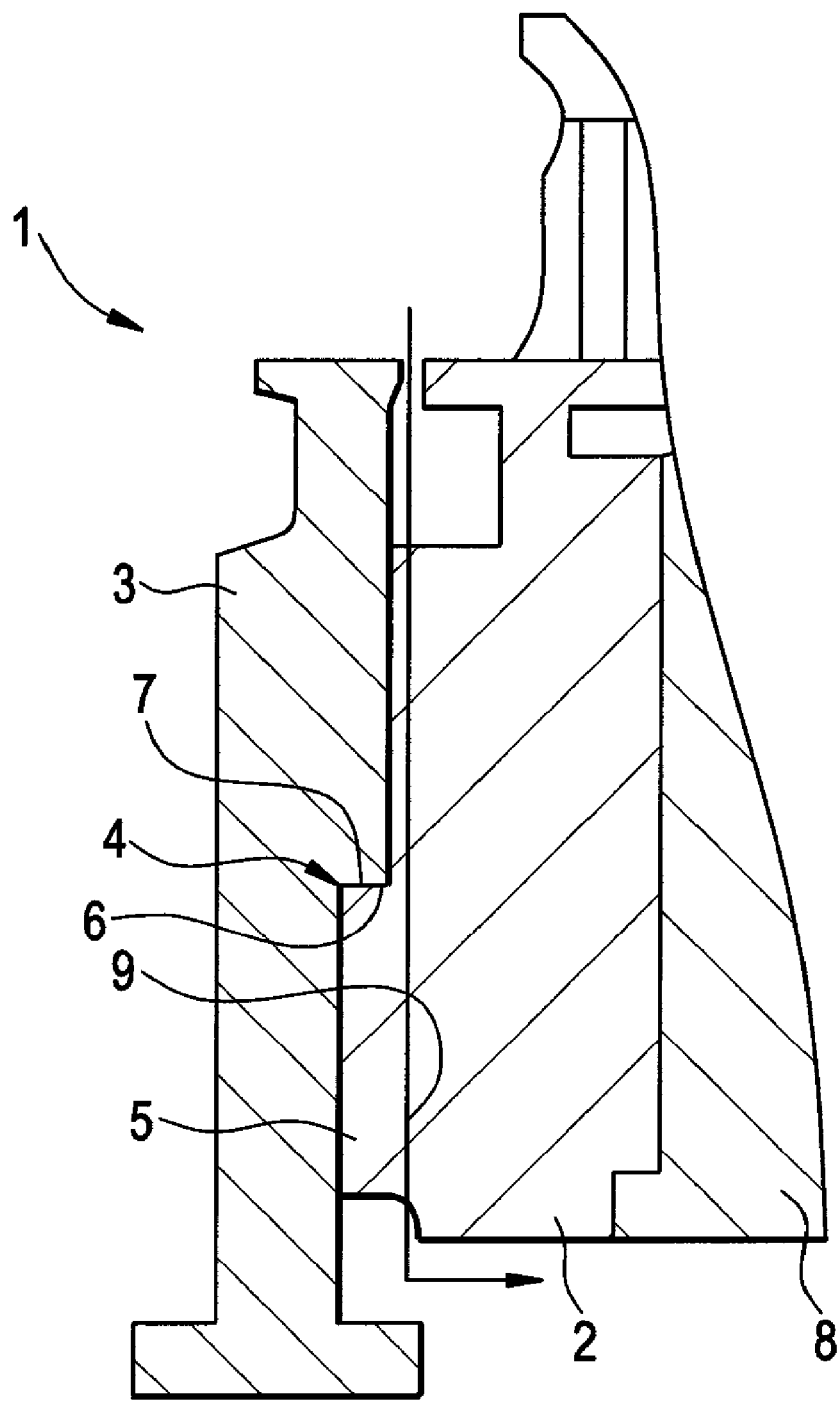
FIG. 1 illustrates a prior art turbomachine.

By the impeller having the upper portion 85 and the lower portion 75, transient thermal response of the two wheels 70, 80 can be synchronized. Synchronized transient thermal response of the wheels 70, 80 provides rabbet joint 90 characteristics as now described. In exemplary embodiments, the upper portion 85 being machined on the wheel 80 and the lower portion 75 being machined on the wheel 70 provides equal exposure of the wheels to the extracted air and thereby equally distributed heating of the wheels 70, 80. Thereby, the difference in transient thermal response between the two wheels 70, 80 is reduced. The equally distributed heat transfer is deduced from the reduced bulk temperature difference between the two wheels 70, 80 as plotted against time. FIG. 3 illustrates an example a plot 300 of bulk temperature difference versus time. The plot 300 illustrates a plot 305 of the bulk temperature difference variation between the wheels 2, 3 of FIG. 1 and a plot 310 of the bulk temperature difference variation between the wheels 70, 80 of FIG. 2. It is appreciated that differential heating of the rabbet joint 4 in FIG. 1 is higher than that of rabbet joint 90 of FIG. 2. The higher differential heating resulting in the configuration of FIG. 1 causes higher rabbet loads and thereby increased crushing stress, leading to cracking of the rabbet joint 4. In the example of FIG. 3 a reduction of bulk temperature difference is realized during a transient point. As such, thermal analysis indicates faster thermal response of the wheel 80 due to increased heat transfer area of the upper portion 85 of the impeller. Thus, bulk temperature difference between the wheels 70, 80 is reduced by about 30 F during the transient. Thus, the difference in the thermal growth of the two wheels 70, 80 involved in the rabbet joint 90 is reduced and hence reduces the rabbet load and associated stresses on the rabbet joint 90. Further, increased length of the rabbet joint 90 provides increased crushing area and thus helps to reduce the stresses on the rabbet joint 90.

It is appreciated that FIG. 3 illustrates only an example of the bulk temperature difference variation, and that other bulk temperature differences are contemplated in other exemplary embodiments. It is further appreciated that the split of the impeller to the upper portion 85 on the wheel 80 and the lower portion 75 on the wheel 70 provides an increased length of the rabbet joint 90, which provides higher crushing area than the rabbet joint 4 of FIG. 1 and thereby reduces crushing stress on the rabbet joint 90. As such, the upper portion 85 and the lower portion 75 provides synchronized thermal response of the wheels 70, 80 and a smooth air flow through the upper portion 85 and the lower portion 75, as indicated by the arrow 95 as against the sudden expansion in the prior art.

It is appreciated that the split-impeller configuration described herein provides equal thermal growth of adjacent wheels in turbomachinery during transient responses. An increase in the rabbet joint length increases the load bearing surface of the rabbet joint thereby reducing cracking. In addition, a constant flow area for the passage of extraction air through impeller formed between the adjacent wheels.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An impeller system in turbomachinery having a turbine, a compressor and a rotor disposed between the turbine and the compressor, the impeller system comprising:
    a first turbomachine wheel
    a second turbomachine wheel disposed adjacent the first turbomachine wheel;
    a rabbet joint defined between the first and second turbomachine wheels; and
    a split impeller disposed on the first and second turbomachine wheels.

2. The impeller system as claimed in claim 1 wherein the first and second turbomachine wheels are compressor wheels.

3. The impeller system as claimed in claim 1 wherein an upper portion of the impeller is disposed on the first turbomachine wheel.

4. The impeller system as claimed in claim 3 wherein a lower portion of the impeller is disposed on the second turbomachine wheel.

5. The impeller system as claimed in claim 1 wherein the rabbet joint is disposed between the upper portion of the impeller and the lower portion of the impeller.

6. The impeller system as claimed in claim 1 wherein the rabbet joint comprises a female portion disposed on the first turbomachine wheel.

7. The impeller system as claimed in claim 6 wherein the rabbet joint comprises a male portion disposed on the second turbomachine wheel.

8. The impeller system as claimed in claim 7 wherein transient heating of the first and second turbomachine wheels is distributed over the male and female portions.

9. The impeller system as claimed in claim 7 wherein a crushing stress between the first turbomachine wheel and the second turbomachine wheel at the rabbet joint is substantially reduced over a length of the rabbet joint.

10. An impeller system in a gas turbine engine having a first stage wheel and a second stage wheel, the impeller system comprising:
    an upper impeller portion disposed on the first stage wheel;
    a lower impeller portion disposed on the second stage wheel; and
    a rabbet joint disposed between the upper impeller portion and the lower impeller portion, wherein the rabbet joint provides an increased contact area between the upper and lower impeller portions.

11. The impeller system as claimed in claim 10 wherein the rabbet joint comprises a female portion disposed on the first stage wheel.

12. The impeller system as claimed in claim 11 wherein the rabbet joint comprises a male portion disposed on the second stage wheel.

13. The impeller system as claimed in claim 12 wherein transient heating of the first and second stage wheels is distributed substantially evenly over the male and female portions.

14. The impeller system as claimed in claim 10 wherein a crushing stress between the first stage wheel and the second stage wheel at the rabbet joint is substantially reduced over a length of the rabbet joint.

15. An impeller system in a rotor assembly for a gas turbine engine having a first turbomachine wheel and a second turbomachine wheel, the impeller system comprising:
a first stage wheel having an upper impeller portion;
a second stage wheel having a lower impeller portion;
a rabbet joint disposed between the upper impeller portion and the lower impeller portion, the upper impeller portion and the lower impeller portion forming a split impeller,
wherein the split impeller distributes transient heat flux on the first stage wheel and the second stage wheel.

16. The impeller system as claimed in claim 15 wherein the rabbet joint comprises a female portion disposed on the first stage wheel.

17. The impeller system as claimed in claim 16 wherein the rabbet joint comprises a male portion disposed on the second stage wheel.

18. The impeller system as claimed in claim 17 wherein the transient heating of the first and second stage wheels is distributed substantially evenly over the male and female portions.

19. The impeller system as claimed in claim 15 wherein a crushing stress between the first stage wheel and the second stage wheel at the rabbet joint is substantially reduced over a length of the rabbet joint.

20. The impeller system as claimed in claim 15 wherein the first stage wheel and the second stage wheel are compressor wheels.

* * * * *